United States Patent
Ding et al.

(10) Patent No.: US 11,210,916 B2
(45) Date of Patent: Dec. 28, 2021

(54) SMOKE DETECTION METHOD AND APPARATUS

(71) Applicant: Fujitsu Limited, Kawasaki (JP)

(72) Inventors: Lan Ding, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 16/714,010

(22) Filed: Dec. 13, 2019

(65) Prior Publication Data
US 2020/0202695 A1 Jun. 25, 2020

(30) Foreign Application Priority Data
Dec. 21, 2018 (CN) .......................... 201811568382.2

(51) Int. Cl.
*G08B 17/12* (2006.01)
*G06T 7/194* (2017.01)
(Continued)

(52) U.S. Cl.
CPC ....... *G08B 17/125* (2013.01); *G06K 9/00362* (2013.01); *G06K 9/00771* (2013.01);
(Continued)

(58) Field of Classification Search
CPC .... G08B 17/125; G08B 17/103; G08B 17/10; G08B 17/107; G08B 17/00; G08B 29/043;
(Continued)

(56) References Cited

U.S. PATENT DOCUMENTS

2008/0181453 A1* 7/2008 Xu .......................... G06T 7/277
382/103
2008/0186191 A1 8/2008 Shen-Kuen
(Continued)

FOREIGN PATENT DOCUMENTS

CN 101233541 A 7/2008
CN 101441771 A 5/2009
(Continued)

OTHER PUBLICATIONS

A Saliency-Based Method for Early Smoke Detection in Video Sequences (Year: 2015).*
(Continued)

*Primary Examiner* — Nizar N Sivji
(74) *Attorney, Agent, or Firm* — Staas & Halsey LLP (57) ABSTRACT

Embodiments of this disclosure provide a smoke detection method and apparatus. The apparatus includes a processor configured to detect foreground blobs in images of a plurality of frames in a video; determine motion areas of detected foreground blobs; determine a first degree of overlapping of the foreground blobs in images of at least two frames, and/or determine a second degree of overlapping of the foreground blobs and motion areas to which the foreground blobs correspond; determine interfering foreground blobs according to the first degree of overlapping and/or the second degree of overlapping; and extract features from motion areas of remaining foreground blobs with the interfering foreground blobs being removed, and detect smoke according to the features. With the embodiments of this disclosure, accuracy of smoke detection may be increased, and false detection resulted from such interfering objects as water blobs, or light spots, etc., may be avoided.

11 Claims, 5 Drawing Sheets

(51) Int. Cl.
*G06T 7/246* (2017.01)
*G06K 9/00* (2006.01)
*G08B 17/103* (2006.01)
*G06T 5/00* (2006.01)

(52) U.S. Cl.
CPC .............. *G06T 7/194* (2017.01); *G06T 7/251* (2017.01); *G08B 17/103* (2013.01); *G06T 5/001* (2013.01); *G06T 2207/10021* (2013.01)

(58) Field of Classification Search
CPC ... G06K 2009/3291; G06K 2207/1016; G06K 9/6288; G06K 9/00362; G06K 9/00771; G06K 9/00744; G06T 7/246; G06T 7/62; G06T 7/194; G06T 7/20; G06T 2207/10016; G06T 7/248; G06T 7/251; G06T 5/001; G06T 2207/10021
See application file for complete search history.

(56) References Cited

U.S. PATENT DOCUMENTS

| | | |
|---|---|---|
| 2009/0226092 A1 | 9/2009 | Kuroda et al. |
| 2009/0315722 A1 | 12/2009 | Hou |
| 2013/0121546 A1 | 5/2013 | Guissin |
| 2016/0260306 A1 | 9/2016 | Jackel |
| 2017/0345179 A1* | 11/2017 | Gao ..................... G06K 9/4671 |
| 2018/0260963 A1 | 9/2018 | Bai |
| 2018/0268556 A1* | 9/2018 | Karavadi ................ G06T 7/277 |
| 2018/0268563 A1* | 9/2018 | Chen ....................... G06T 7/194 |

FOREIGN PATENT DOCUMENTS

| | | |
|---|---|---|
| CN | 101609589 A | 12/2009 |
| CN | 101738394 A | 6/2010 |
| CN | 101751558 A | 6/2010 |
| CN | 101908141 A | 12/2010 |
| CN | 101916372 A | 12/2010 |
| CN | 102136059 A | 7/2011 |
| CN | 102663869 A | 9/2012 |
| CN | 103983574 A | 8/2014 |
| CN | 104050480 A | 9/2014 |
| CN | 104316974 A | 1/2015 |
| CN | 104408745 A | 3/2015 |
| CN | 104978733 A | 10/2015 |
| CN | 105528581 | 4/2016 |
| CN | 107067412 | 8/2017 |
| CN | 107749067 | 3/2018 |
| EP | 2000952 A2 | 12/2008 |
| EP | 2000952 A3 | 6/2010 |
| JP | 4926603 B2 | 2/2012 |
| JP | 2014-191376 | 10/2014 |
| KR | 10-2008-0077481 | 8/2008 |
| WO | WO 2017084094 A1 | 5/2017 |

OTHER PUBLICATIONS

Early Fire and Smoke Detection Based on Colour Features and Motion Analysis (Year: 2012).*
Research on a Hibrid Moving Object Detection Algorithm in Video Surveillance System (Year: 2011).*
Spatio-Temporal Analysis in Smoke Detection (Year: 2009).*
Smoke Detection in Video (Year: 2009).*
Smoke Detection for Static Cameras (Year: 2015).*
Shi Jinting et al. "Video smoke detection: a literature survey", Journal of Image and Graphics, vol. 23, No. 3, Mar. 2018.
Extended European Search Report dated Apr. 29, 2020 in European Patent Application No. 19211478.3.
Dongkeun Kim et al, "Smoke Detection in Video", 2009 World Congress On Computer Science And Information Engineering, IEEE, Piscataway, NJ, USA, Mar. 31, 2009 (Mar. 31, 2009), pp. 759-763, XP031494094.
Nazim S. A Khalid et al, "Motion Blobs as a Feature for Detection on Smoke", International Journal Of Advanced Computer Science And Applications (IJACSA), Special Issue On Artificial Intelligence, 2011, XP055686941, 4 pages.
Sergey V Ablameyko et al, "Smoke Detection In Video Based On Motion And Contrast", Journal of Computer Science and Cybernetics, vol. 28, No. 3, 2012, pp. 195-205, XP055686946.
Notice of Reexamination dated Jul. 21, 2021 in corresponding Chinese Patent Application No. 201580084015.3 ( 9 pages) (10 pages English Translation).
Written Opinions of the International Searching Authority (Forms PCT/ISA/237, PCT/ISA/220, PCT/ISA210); dated Jul. 1, 2016 in corresponding PCT Application No. PCT/CN2015/095178 (13 pages) (3 pages English Translation).
U.S. Office Action dated Feb. 10, 2020 in U.S. Appl. No. 15/978,817.
U.S. Office Action dated Apr. 22, 2020 in U.S. Appl. No. 15/978,817.
U.S. Notice of Allowance dated Sep. 8, 2020 in U.S. Appl. No. 15/978,817.
Barmpoutis, P.—"Smoke detection using spatio-temporal analysis, motion modeling and dynamic texture recognition"—Nov. 13, 2014—IEEE, pp. 1078-1082 (Year: 2014).
First Office Action dated May 5, 2019 in related Chinese Patent Application No. 201580084015.3 (7 pages) (11 pages English Translation).
Search Report dated May 5, 2019 in related Chinese Patent Application No. 201580084015.3 (4 pages) (3 pages English Translation).
Partial Supplementary European Search Report dated Jun. 3, 2019 in related European Patent Application No. 15908590.1 (17 pages).
Chen-Yu Lee et al: "Spatio-temporal analysis in smoke detection"; Signal and Image Processing Applications (ICSIPA), 2009 IEEE International Conference on, Nov. 18, 2009 (Nov. 18, 2009), pp. 80-83, XP031685430, IEEE, Piscataway, NJ, USA ISBN: 978-1-4244-5560-7 (4 pages).
Yong-Ren Pu et al: "Study of smoke detection by analysis of saturation in video"; Fluid Power and Mechatronics (FPM), 2011 International Conference on, Aug. 17, 2011 (Aug. 17, 2011), pp. 169-172, XP032459113, IEEE, Piscataway, NJ USA DOI: 10.1109/FPM.2011.6045751 ISBN: 978-1-4244-8451-5 (4 pages).
Notification of Reasons for Refusal Office Action dated Aug. 6, 2019 in related in Japanese Patent Application No. 2018-525692 (8 pages) (8 pages English Translation).
Extended European Search Report dated Sep. 26, 2019 in related European Patent Application No. 15908590.1 (14 pages).
Chinese Office Action and Search Report dated Nov. 18, 2019 in corresponding Chinese Patent Application 201580084015.3 Office Action: (8 pages) (12 pages English Translation); Search Report: (3 pages) (2 pages English Translation).
Decision of Rejection dated Apr. 24, 2020 in related Chinese Patent Application No. 201580084015.3 (6 pages) (10 pages English Translation).
European Communication dated Feb. 22, 2021 in European Patent Application No. 15908590.1.
Notice of Reexamination dated Oct. 12, 2021 in corresponding Chinese Patent Application No. 201580084015.3 (18 pages) (49 pages English Translation).

\* cited by examiner

SMOKE DETECTION METHOD AND APPARATUS

CROSS-REFERENCE TO RELATED APPLICATIONS

This application is based on and hereby claims priority to Chinese Application No. 201811568382.2, filed Dec. 21, 2018, in the State Intellectual Property Office of China, the disclosure of which is incorporated herein by reference.

FIELD

This disclosure relates to the field of image processing, and in particular to a smoke detection method and apparatus.

BACKGROUND

Fires often cause great damage to people. Since smoke usually occurs before the fire spreads, if smoke can be detected as soon as possible, it may effectively prevent the spread of fire. At present, smoke detection algorithms based on conventional computer vision and pattern recognition have achieved good detection results.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that if a fire occurs in a harsh outdoor environment such as rain or excessive light reflection, water blobs, or light spots of light reflection may fall on a lens of a video monitor, which may result in false detection of smoke.

Embodiments of this disclosure provide a smoke detection method and apparatus and an image processing device to solve the problems existing in the related art, which may increase accuracy of smoke detection, and avoid false detection resulted from such interfering objects as water blobs, or light spots, etc.

According to a first aspect of the embodiments of this disclosure, there is provided a smoke detection apparatus, including a memory and a processor. According to an embodiment, the processor is configured to detect foreground blobs in images of a plurality of frames in a video; determine motion areas of detected foreground blobs; determine a first degree of overlapping of the foreground blobs in images of at least two frames, and/or determine a second degree of overlapping of the foreground blobs and motion areas to which the foreground blobs correspond; determine at least one interfering foreground blob according to the first degree of overlapping and/or the second degree of overlapping; and extract features from motion areas of remaining foreground blobs with the at least one interfering foreground blob being removed, and detect whether smoke exists in the video according to the extracted features.

According to a second aspect of the embodiments of this disclosure, there is provided a smoke detection method. The method, according to an embodiment, includes detecting foreground blobs in images of a plurality of frames in a video; determining motion areas of detected foreground blobs; where a first degree of overlapping of the foreground blobs in images of at least two frames is determined, and/or a second degree of overlapping of the foreground blobs and motion areas to which the foreground blobs correspond is determined. The method includes determining at least one interfering foreground blob according to the first degree of overlapping and/or the second degree of overlapping; and extracting features from motion areas of remaining foreground blobs with the at least one interfering foreground blob being removed, where smoke is detected according to the extracted features.

According to a third aspect of the embodiments of this disclosure, there is provided an image processing device, including the smoke detection apparatus as described in the first aspect.

Advantages of the embodiments of this disclosure exist in that at least one interfering foreground blob in the smoke detection are determined and removed according to the degree of overlapping of the foreground blobs in images of at least two frames and/or according to the degree of overlapping of the foreground blobs and the motion areas to which the foreground blobs correspond. Hence, the problems existing in the related art may be solved, accuracy of smoke detection may be increased, and false detection resulted from such interfering objects as water blobs, or light spots, etc., may be avoided.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises", "comprising", "includes" "including" when used in this specification is taken to specify the presence of stated features, integers, steps/operations or components but does not preclude the presence or addition of one or more other features, integers, steps/operations, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

These and further aspects and features of the present disclosure will be apparent with reference to the following description and attached drawings. These embodiments are illustrative only, and not intended to limit this disclosure. In order that those skilled in the art are able to understand easily the principle and embodiments of this disclosure, the embodiments of this disclosure shall be described by taking a reconstructed image of image compression processing as an example. However, it should be understood that the embodiments of this disclosure are not limited thereto, and other reconstructed images based on image compression processing are also covered by the scope of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

The embodiments of this disclosure shall be described below with reference to the accompanying drawings.

Embodiment 1

Figure 1:
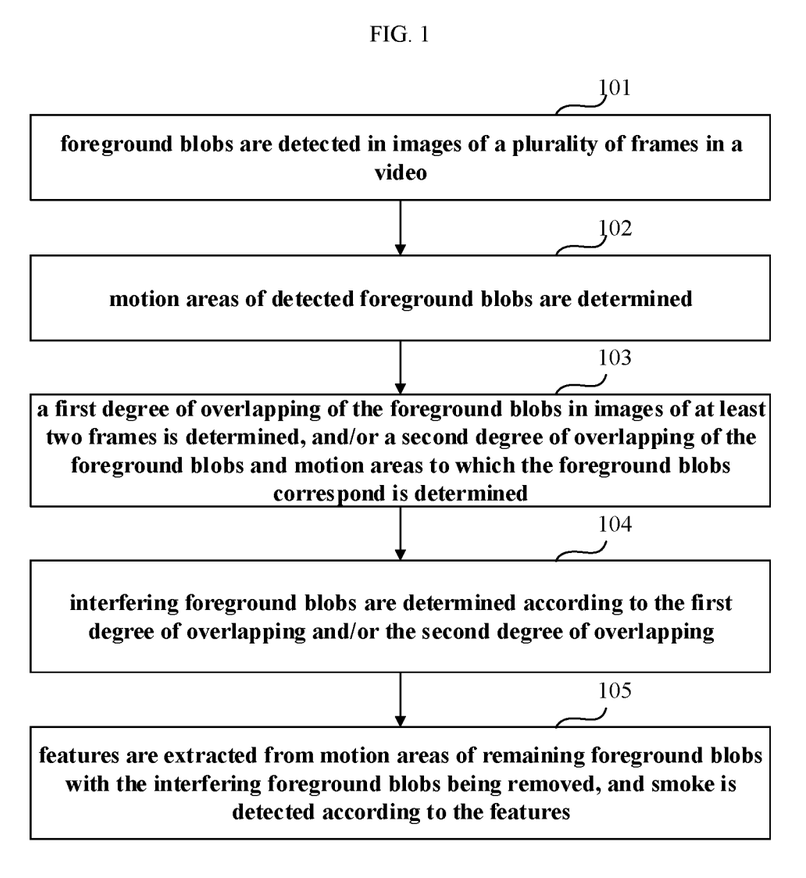
FIG. 1 is a schematic diagram of the smoke detection method according to an embodiment.

Embodiment 1 provides a smoke detection method. FIG. 1 is a flowchart of the method. As shown in FIG. 1, the method includes:

operation 101: foreground blobs are detected in images of a plurality of frames in a video;

operation 102: motion areas of detected foreground blobs are determined;

operation 103: a first degree of overlapping of the foreground blobs in images of at least two frames is determined, and/or a second degree of overlapping of the foreground blobs and motion areas to which the foreground blobs correspond is determined;

operation 104: interfering foreground blobs are determined according to the first degree of overlapping and/or the second degree of overlapping; and operation 105: features are extracted from motion areas of remaining foreground blobs with the interfering foreground blobs being removed, and smoke is detected according to the features.

In this embodiment, the interfering foreground blobs in the smoke detection are determined and removed according to the degree of overlapping of the foreground blobs in images of at least two frames and/or according to the degree of overlapping of the foreground blobs and the motion areas to which the foreground blobs correspond. Hence, the problems existing in the related art may be solved, accuracy of smoke detection may be increased, and false detection resulted from such interfering objects as water blobs, or light spots, etc., may be avoided.

In this embodiment, in operation 101, the video including images of a plurality of frames may be acquired by using devices such as a camera, and the video is decoded to obtain the images of a plurality of frames. A decoding method may refer to related art, for example, the obtained video stream is subjected to entropy decoding, inverse quantization, inverse transform, and combined with the inter-frame prediction result to obtain images of decoded frames.

In this embodiment, in operation 101, before detecting the foreground blobs, in order to improve the accuracy of the detection result of the foreground blobs, the frame image may be pre-processed, such as sharpening each frame image, etc., so as to enhance edges of the image and grayscale hopping part, make the image more clear, eliminate or reduces noises, and extract the foreground blobs. The related art, such as high-pass filtering or spatial domain differentiation, etc., may be used for the sharpening processing, and this embodiment is not limited thereto.

In this embodiment, in operation 101, in detecting the foreground blobs according to the images of plurality of (N) frames, such algorithms as frame difference, background subtraction, and optical flow, etc., in the related art may be used. For example, a background image modeling method based on the Gaussian Mixture Model (GMM) may be used to perform background modeling on the images of a plurality of frames to obtain the foreground blocks and a background image; however, this disclosure is not limited thereto.

In this embodiment, in operation 102, in order to analyze features of smoke during a motion process, it is needed to perform tracking analysis on the foreground blobs suspected of smoke in a time sequence, that is, to track a motion process of each foreground blob in the images of plurality of (N) frames, so as to obtain motion areas of the foreground blobs in the images of a plurality of frames. An existing blob matching algorithm may be used as the tracking method, such as dividing the frame image into different macroblobs, and performing search matching within a set range of adjacent frame images to find a best blob in the current frame (N-th frame) similar to the foreground blob. The existing minimum mean absolute difference (MAD) and minimum mean square error (MSE) algorithm, or the like, may be used for judging a similarity. Positions of the foreground blobs in the frame images may be determined according to the above tracking algorithm, and the motion areas of the foreground blobs are constituted by combining the above tracked positions in the images of a plurality of frames.

In this embodiment, alternatively, in order to reduce an amount of calculation and improve detection precision, pre-screening may be performed in operations 101-102, that is, detecting foreground blobs suspected of being smoke and motion areas of the foreground blobs suspected of being smoke in all foreground blobs and motion areas. For example, when shapes, contours, colors, etc., of the detected foreground blobs do not conform to features of smoke, such foreground blobs need not to be tracked, or when motion areas of the detected foreground blobs are moving downwards or completely motionless, that is, do not conform to motion features of smoke, processing in subsequent operations 103-105 need not to be performed on such foreground blobs.

In this embodiment, in an outdoor environment, when rain occurs or light reflection is relatively strong, water blobs or light spots may fall on a lens of a video monitor, and since such features as colors or contours, etc., of the water blobs and the light spots are similar to smoke, it is possible that false detection will be resulted in. Considering that motion modes of such interfering objects as water blobs or light spots are different from that of smoke, for example, compared with the above-mentioned interfering objects, moving speed of the smoke is faster, the smoke does not stay in one position for a long time, and the area of a motion area is relatively large, while such interfering objects as water blobs or light spots may stay at a position in the video image for a relatively long time, and the area of motion areas are relatively small. This embodiment proposes a method for determining and removing interfering foreground blobs from foreground blobs suspected of being smoke according to degrees of overlapping of foreground blobs in images of at least two frames and/or according to degrees of overlapping of foreground blobs and motion areas to which the foreground blobs correspond, which shall be described below in detail in operations 103 and 104.

In this embodiment, in one implementation of operations 103-104, the interfering foreground blobs may be determined according to the foreground blobs (or may also be foreground blobs suspected of being smoke, which shall not be differentiated in the following description) detected in operation 101.

In this implementation, after the foreground blobs are detected in operation 101, the interfering foreground blobs are determined during the foreground blob tracking process in operation 102. In calculating a first degree of overlapping a foreground blob, a first overlapping area of the foreground blob in images of a first number of frames is calculated, a first area of the foreground blob is calculated, and a ratio of the first overlapping area to the first area is taken as the first degree of overlapping of the foreground block. A method for calculating first degrees of overlapping of other foreground blobs is identical to the method for calculating the first degree of overlapping of the foreground blob.

In this implementation, in order to calculate the overlapping area, the first number needs to be greater than or equal to 2. In order to improve the detection precision, the first number of frames may be adjacent frames, and the adjacent frames denote frames adjacent to one frame in multiple frames in a certain range. The one frame may be the current frame (the N-th frame), or may be a frame preceding the current frame (an (N−1)-th frame), or may be an (N−i)-th frame (i being greater than 1); however, this embodiment is not limited thereto. Alternatively, the adjacent frames are consecutive frames. And the first area may be an area of the one foreground blob in an image of any frame in the image of N frames, such as the (N−1)-th frame, or the N-th frame; however, this embodiment is not limited thereto.

Figure 2:
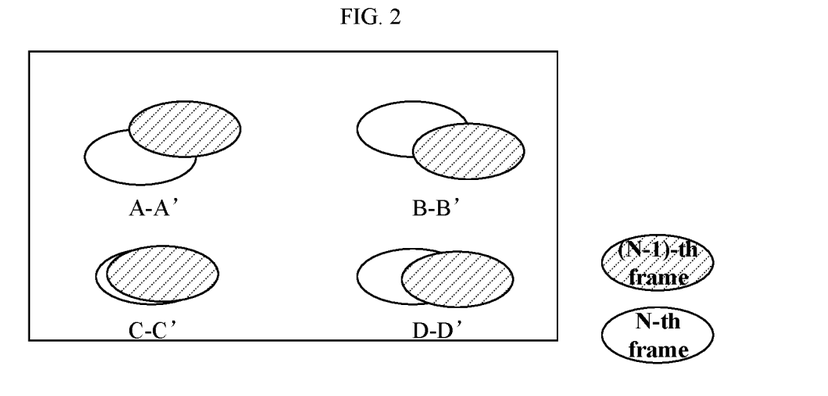
FIG. 2 is a schematic diagram of the first degree of overlapping according to an embodiment.

For example, when the first number is 2, the first number of frames may be the current frame in the images of a plurality of frames of the video, i.e. the N-th frame, and a frame preceding the current frame, i.e. the (N−1)-th frame. FIG. 2 is a schematic diagram of the first degree of overlapping. As shown in FIG. 2, the foreground blobs detected in the N-th frame are A, B, C and D, and the foreground blobs detected in the (N−1)-th frame are A', B', C' and D'. In the foreground blob tracking process, A-A' are the same foreground, B-B' are the same foreground, C-C' are the same foreground, and D-D' are the same foreground. For the foreground blob A-A', a first degree of overlapping thereof may be calculated by using formula (1) below:

$$IoU_1 = \frac{Blob_{N-1} \cap Blob_N}{Blob_{N-1}}; \quad \text{formula (1)}$$

where, $IoU_1$ denotes the first degree of overlapping, $Blob_{N-1}$ and Blob N may both denote the first area, and $Blob_{N-1} \cap Blob_N$ denotes a first area of overlapping of the foreground blob in the N-th frame and the (N−1)-th frame. How to calculate the first degree of overlapping is described above by taking that the first number is 2 and the foreground blob is the foreground blob A-A' as an example. Methods for calculating degrees of overlapping of the foreground blobs B-B', C-C' and D-D' are similar to formula (1). And furthermore, the first number may be greater than 2, and the first area of overlapping may also be overlapped parts of the foreground blob in an image of more than three frames, which shall not be enumerated herein any further.

In this implementation, in comparison with smoke, as water blobs or light spots will not move substantially in adjacent frames, in other words, the first overlapping area of the interfering foreground block is close to the first area, and the first degree of overlapping is relatively large, a first threshold may be predetermined, and foreground blocks with first degrees of overlap being greater than or equal to the first threshold are determined as the interfering foreground blocks. The first threshold may be determined empirically, and this embodiment is not limited thereto.

In this embodiment, in another implementation of operations 103-104, the interfering foreground blocks may be determined according to the foreground blobs (or may also be foreground blobs suspected of being smoke, which shall not be differentiated in the following description) detected in operation 101 and the motion areas (or may also be motion areas suspected of being smoke, which shall not be differentiated in the following description) of the foreground blocks detected in operation 102.

In this implementation, after the end of the tracking in operation 102, the interfering foreground blocks may be determined according to the foreground blobs detected in operation 101 and the motion areas of the foreground blobs detected in operation 102. In calculating a second degree of overlapping of a foreground blob, a second area of overlapping of an area of the foreground blob and a second area of a motion area of the foreground block is calculated, and a ratio of the second area of overlapping to the second area as the second degree of overlapping. A method for calculating second degrees of overlapping of other foreground blobs is identical to the method for calculating the second degree of overlapping of the foreground blob.

In this implementation, reference may be made to the above first area for a method for calculating the area of the foreground blob. The second area may be an area of the motion area detected in the above N frames, or may be an area of a motion area detected in a second number of frames at rear positions in the N frames, in which case the area of the foreground blob may be an area in an image of one frame in the second number of frames; however, this embodiment is not limited thereto. The second number is greater than or equal to the first number, and the second number of frames may be adjacent frames, and optionally, they may be consecutive frames.

Figure 3:
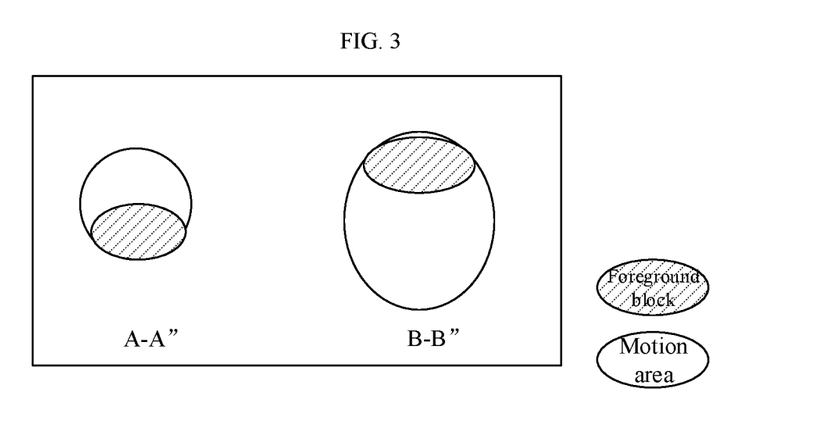
FIG. 3 is schematic diagram of the second degree of overlapping according to an embodiment.

For example, the area of the foreground block is the area of the N-th frame, and the area of the motion area is the area of the motion area of the foreground blob in the N frames. FIG. 3 is a schematic diagram of the second degree of overlapping. As shown in FIG. 3, the foreground blobs detected in the N-th frame are A and B, and after the foreground blob tracking process, a motion area of A in the N frames is A", and a motion area of B in the N frames is B". For the foreground block A, the second degree of overlapping thereof may be calculated by using formula (2) below:

$$IoU_2 = \frac{Blob_A \cap Blob_{A''}}{Blob_{A''}};$$ formula (2)

where, $IoU_2$ denotes the second degree of overlapping, $Blob_A$ denotes the area of the foreground block, $Blob_{A''}$ denotes the area of the motion area of the foreground block, and $Blob_A \cap Blob_{A''}$ denotes the second area of overlapping. How to calculate the second degree of overlapping is described above by taking the foreground block A as an example, and a method for calculating the second degree of overlapping of the foreground block B is similar to formula (2), which shall not be enumerated herein any further.

In this implementation, in comparison with smoke, as water blobs or light spots will not move substantially in adjacent frames, in other words, the area of the motion area of the interfering foreground blob is relatively small and close to the area of the foreground blob, and the second degree of overlapping is relatively large, a second threshold may be predetermined, and foreground blocks with second degrees of overlap being greater than or equal to the second threshold are determined as the interfering foreground blocks. The second threshold may be determined empirically, and this embodiment is not limited thereto.

In this embodiment, in another implementation of operations 103-104, the above first degree of overlapping and second degree of overlapping may be respectively calculated, and the interfering foreground blocks are determined and removed according to the first degree of overlapping and second degree of overlapping, which shall not be described herein any further.

In this embodiment, in operation 105, the features are extracted from the motion areas of the remaining foreground blobs (or remaining foreground blobs suspected of being smoke) with the interfering foreground blobs being removed. For example, the features may include saturation-related information, a grayscale variance value, and a gradient grayscale mean value, and the like. Whether there exists smoke is determined according to the features. Reference may be made to the related art for a method for extracting the above features, which shall not be enumerated herein any further.

For example, a saturation of smoke is generally low, and when an extracted feature is a saturation mean value, whether the saturation mean value is greater than or equal to a third threshold is judged, and when it is greater than or equal to the third threshold, it is determined that there exists no smoke.

For example, a texture of smoke is generally low, and when an extracted feature is a grayscale variance, whether the grayscale variance is greater than or equal to a fourth threshold is judged, and when it is greater than or equal to the fourth threshold, it is determined that there exists no smoke.

For example, smoke generally has a feature of diffuse divergence, and when an extracted feature is a grayscale mean value, whether a difference between the grayscale mean value and a background grayscale mean value is less than or equal to a fifth threshold is judged, and when it is less than or equal to the fifth threshold, it is determined that there exists no smoke.

How to judge whether there exists smoke is schematically described above; however, this disclosure is not limited thereto, for example, other features may be used for judgment, such as a gradient direction, or the like. Furthermore, one or more of the above implementations may be employed. For example, only one of the implementations may be used, or at least two of the above implementations may be used. Moreover, an order of the above judgment is not limited, and in practical use, a detailed detection scheme may be determined according to an actual situation.

Figure 4:
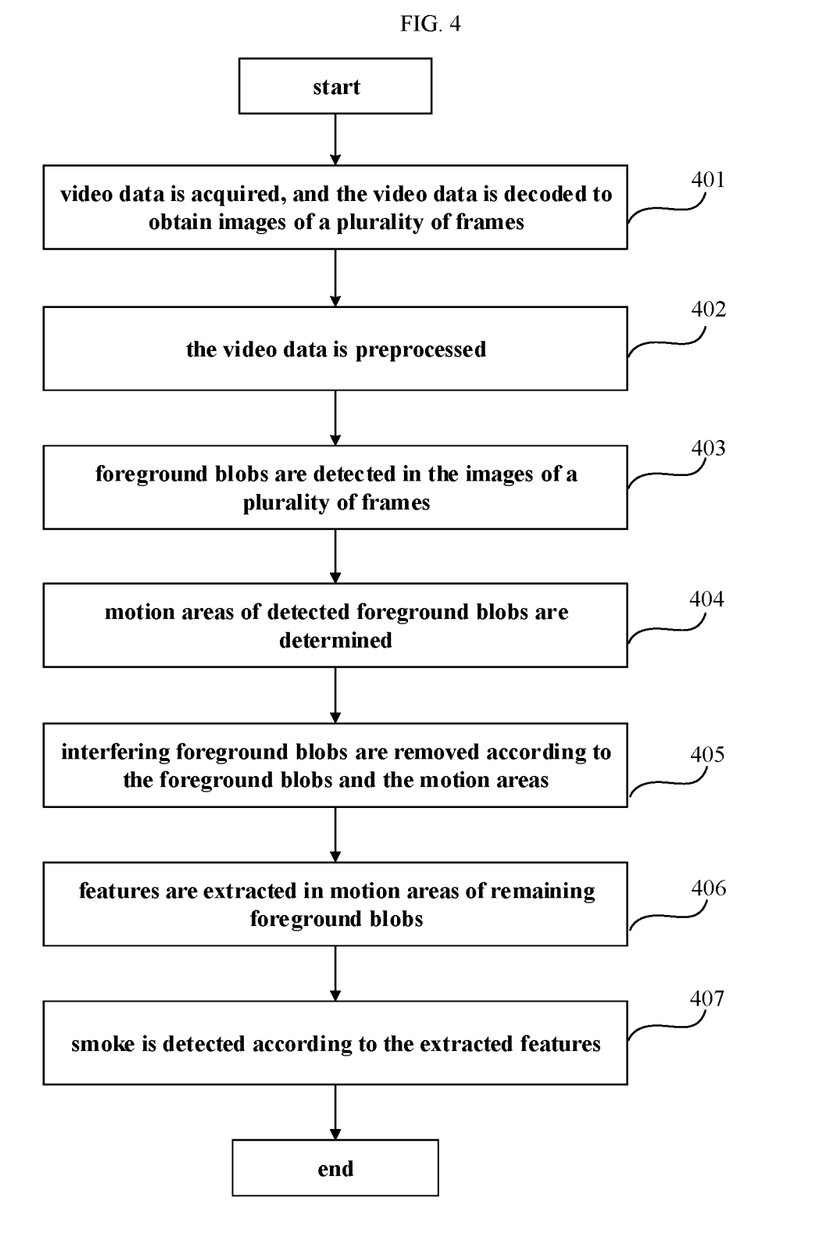
FIG. 4 is a flowchart of the smoke detection method according to an embodiment.

FIG. 4 is a flowchart of the smoke detection method of this embodiment. As shown in FIG. 4, the method includes:

operation 401: video data is acquired, and the video data is decoded to obtain images of a plurality of frames;

operation 402: the video data is preprocessed (optional);

operation 403: foreground blobs are detected in the images of a plurality of frames;

operation 404: motion areas of detected foreground blobs are determined;

operation 405: interfering foreground blobs are removed according to the foreground blobs and the motion areas;

operation 406: features are extracted in motion areas of remaining foreground blobs; and operation 407: smoke is detected according to the extracted features.

In this embodiment, reference may be made to above-described operations 101-102 for implementations of operations 401-404, and reference may be made to above-described operation 105 for implementation of operations 406-407, which shall not be described herein any further.

In this embodiment, in operation 405, the first degree of overlapping and/or the second degree of overlapping may be calculated according to the foreground blobs and the motion areas, and the interfering foreground blobs (water blobs or light spots) may be determined according to the first degree of overlapping and/or the second degree of overlapping, and reference may be made to operations 103-104 for implementations thereof, which shall not be described herein any further. Furthermore, in operation 405, it is included to use other methods to remove other types of interfering foreground blobs, such as removing mobile interfering foreground blobs or static interfering foreground blobs, such as vehicles and people, etc. Reference may be made to the related art for a method for determining the mobile interfering foreground blobs or static interfering foreground blobs, which shall not be described herein any further. Hence, with operation 405, some of interfering foreground blobs in the detected foreground blobs are removed in advance, which may not only improve accuracy of smoke detection, but also improve speed of smoke detection.

With the above embodiment, the interfering foreground blobs in the smoke detection are determined and removed according to the degree of overlapping of the foreground blobs in images of at least two frames and/or according to the degree of overlapping of the foreground blobs and the motion areas to which the foreground blobs correspond. Hence, the problems existed in the related art may be solved, accuracy of smoke detection may be increased, and false detection resulted from such interfering objects as water blobs, or light spots, etc., may be avoided.

Embodiment 2

Embodiment 2 provides a smoke detection apparatus. As principles of the apparatus for solving problems are similar to that of the method in Embodiment 1, reference may be made to the implementation of the method in Embodiment 1 for implementation of the apparatus, with identical contents being not going to be described herein any further.

Figure 5:
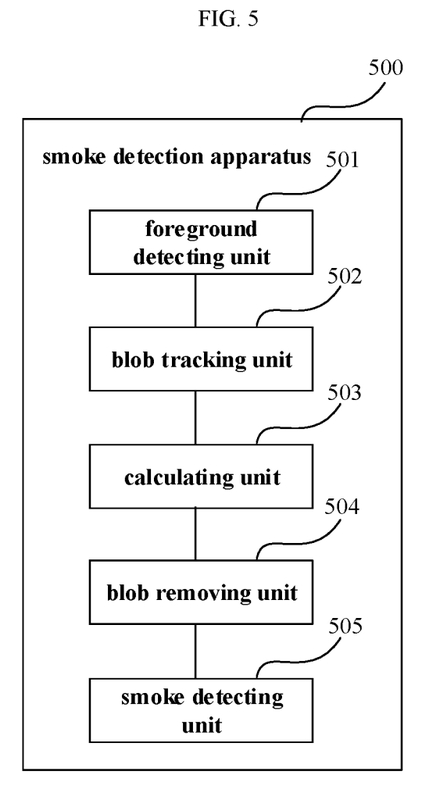
FIG. 5 is a schematic diagram of the smoke detection apparatus according to an embodiment.

FIG. 5 is a schematic diagram of a structure of the smoke detection apparatus. As shown in FIG. 5, the apparatus 500 includes:

a foreground detecting unit 501 configured to detect foreground blobs in images of a plurality of frames in a video;

a blob tracking unit 502 configured to determine motion areas of detected foreground blobs;

a calculating unit 503 configured to determine a first degree of overlapping of the foreground blobs in images of at least two frames, and/or determine a second degree of overlapping of the foreground blobs and motion areas to which the foreground blobs correspond;

a blob removing unit 504 configured to determine interfering foreground blobs according to the first degree of overlapping and/or the second degree of overlapping; and a smoke detecting unit 505 configured to extract features from motion areas of remaining foreground blobs with the interfering foreground blobs being removed, and detect smoke according to the features.

In this embodiment, the interfering foreground blobs in the smoke detection are determined and removed according to the degree of overlapping of the foreground blobs in images of at least two frames and/or according to the degree of overlapping of the foreground blobs and the motion areas to which the foreground blobs correspond. Hence, the problems existing in the related art may be solved, accuracy of smoke detection may be increased, and false detection resulted from such interfering objects as water blobs, or light spots, etc., may be avoided.

In this embodiment, reference may be made to operations 101-105 in Embodiment 1 for implementations of the foreground detecting unit 501, the blob tracking unit 502, the calculating unit 503, the blob removing unit 504 and the smoke detecting unit 505, which shall not be described herein any further.

In this embodiment, in calculating a first degree of overlapping of a foreground blob, the calculating unit 503 calculates a first overlapping area of the foreground blob in images of a first number of frames, calculates a first area of the foreground blob, and takes a ratio of the first overlapping area to the first area as the first degree of overlapping.

For example, the first number is greater than or equal to 2, and the first number of frames are a current frame and a frame preceding the current frame in the images of a plurality of frames of the video. Optionally, the first number of frames may be consecutive frames.

In this embodiment, in calculating a second degree of overlapping of a foreground blob, the calculating unit 503 calculates a second overlapping area of an area of the foreground blob and a second area of a motion area of the foreground blob, and takes a ratio of the second overlapping area to the second area as the second degree of overlapping.

In this embodiment, the blob removing unit 504 determines a foreground blob with the first degree of overlapping being greater than or equal to a first threshold as an interfering foreground blob, and/or, the blob removing unit 504 determines a foreground blob with the second degree of overlapping being greater than or equal to a second threshold as an interfering foreground blob.

For example, the interfering foreground blobs are water blobs and/or light spots.

With the above embodiment, the interfering foreground blobs in the smoke detection are determined and removed according to the degree of overlapping of the foreground blobs in images of at least two frames and/or according to the degree of overlapping of the foreground blobs and the motion areas to which the foreground blobs correspond. Hence, the problems existing in the related art may be solved, accuracy of smoke detection may be increased, and false detection resulted from such interfering objects as water blobs, or light spots, etc., may be avoided.

Embodiment 3

The embodiment of this disclosure provides an image processing device, including the smoke detection apparatus described in Embodiment 2, with its contents being incorporated herein. The image processing device may be a computer, a server, a working station, a lap-top computer, and a smart mobile phone, etc.; however, the embodiment of this disclosure is not limited thereto.

Figure 6:
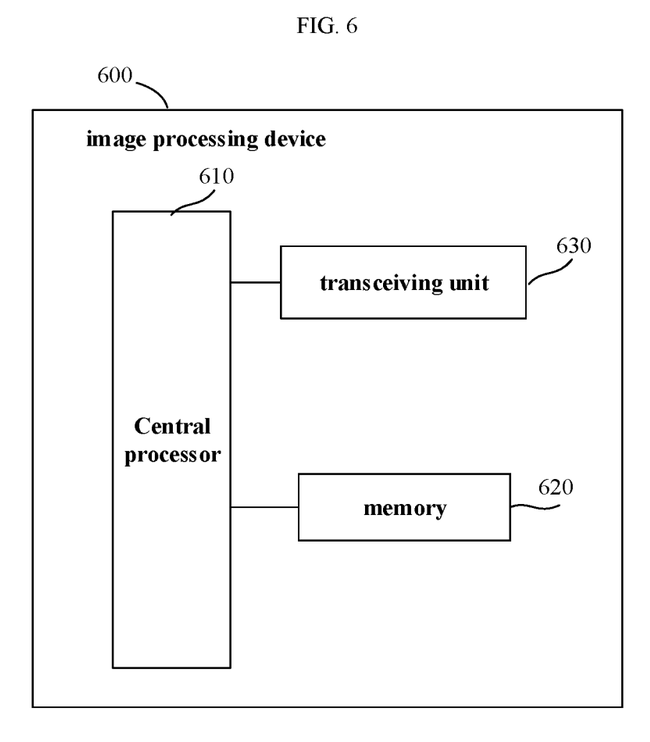
FIG. 6 is a schematic diagram of a hardware structure of the image processing device according to an embodiment.

FIG. 6 is a schematic diagram of the image processing device in the embodiment of this disclosure. As shown in FIG. 6, the image processing device 600 may include a processor (such as a central processing unit (CPU)) 610 and a memory 620, the memory 620 being coupled to the central processing unit 610. The memory 620 may store various data, and furthermore, it may store a program for information processing, and execute the program under control of the processor 610.

In one implementation, the functions of the smoke detection apparatus 500 may be integrated into processor 610. The processor 610 may be configured to carry out the smoke detection method described in Embodiment 1.

In another implementation, the smoke detection apparatus 500 and the processor 610 may be configured separately. For example, the smoke detection apparatus 500 may be configured as a chip connected to the processor 610, with the functions of the smoke detection apparatus 500 being carried out under control of the processor 610.

For example, the processor 610 may be configured to perform following control: detecting foreground blobs in images of a plurality of frames in a video; determining motion areas of detected foreground blobs; determining a first degree of overlapping of the foreground blobs in images of at least two frames, and/or determining a second degree of overlapping of the foreground blobs and motion areas to which the foreground blobs correspond; determining interfering foreground blobs according to the first degree of overlapping and/or the second degree of overlapping; and extracting features from motion areas of remaining foreground blobs with the interfering foreground blobs being removed, and detecting smoke according to the features.

Reference may be made to Embodiment 1 for a particular implementation of the processor 610, which shall not be described herein any further.

Furthermore, as shown in FIG. 6, the image processing device 600 may include a transceiving unit 630, etc. Functions of the above components are similar to those in the related art, and shall not be described herein any further. It should be noted that the image processing device 600 does not necessarily include all the parts shown in FIG. 6, and furthermore, the image processing device 600 may include parts not shown in FIG. 6, and the related art may be referred to.

An embodiment of the present disclosure provides a computer readable program, which, when executed in a smoke detection apparatus, will cause a computer to carry out the smoke detection method described in Embodiment 1 in the smoke detection apparatus.

An embodiment of the present disclosure provides a computer readable medium, including a computer readable program, which will cause a computer to carry out the smoke detection method described in Embodiment 1 in a smoke detection apparatus.

The smoke detection method carried out in the smoke detection apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 5-6 may either correspond to software modules of procedures of a computer program, or correspond to hardware modules. Such software modules may respectively correspond to the operations shown in FIGS. 1 and 4. And the hardware module, for example, may be carried out by firming the soft modules by using a field programmable gate array (FPGA). The method in an apparatus described with reference to the embodiments of this disclosure may be directly embodied as hardware, software modules executed by a processor, or a combination thereof. A reference to "unit" as used herein may refer to circuitry structured as hardware implementation of the smoke detection apparatus.

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a smoke detection apparatus, and may also be stored in a memory card of a pluggable smoke detection apparatus.

One or more functional blocks and/or one or more combinations of the functional blocks in FIGS. 5-6 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 5-6 may also be realized as a combination of computing equipment, such as a combination of a DSP and a microprocessor, multiple microprocessors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

1. A smoke detection apparatus, including:
a foreground detecting unit configured to detect foreground blobs in images of a plurality of frames in a video;
a blob tracking unit configured to determine motion areas of detected foreground blobs;
a calculating unit configured to determine a first degree of overlapping of the foreground blobs in images of at least two frames, and/or determine a second degree of overlapping of the foreground blobs and motion areas to which the foreground blobs correspond;
a blob removing unit configured to determine interfering foreground blobs according to the first degree of overlapping and/or the second degree of overlapping; and
a smoke detecting unit configured to extract features from motion areas of remaining foreground blobs with the interfering foreground blobs being removed, and detect smoke according to the features.

2. The apparatus according to supplement 1, wherein in calculating a first degree of overlapping of a foreground blob, the calculating unit calculates a first overlapping area of the foreground blob in images of a first number of frames, calculates a first area of the foreground blob, and takes a ratio of the first overlapping area to the first area as the first degree of overlapping.

3. The apparatus according to supplement 2, wherein the first number is greater than or equal to 2.

4. The apparatus according to supplement 2, wherein the first number of frames are a current frame and a frame preceding the current frame in the images of a plurality of frames of the video.

5. The apparatus according to supplement 2, wherein the first number of frames are consecutive frames.

6. The apparatus according to supplement 1, wherein in calculating a second degree of overlapping of a foreground blob, the calculating unit calculates a second overlapping area of an area of the foreground blob and a second area of a motion area of the foreground blob, and takes a ratio of the second overlapping area to the second area as the second degree of overlapping.

7. The apparatus according to supplement 1, wherein the blob removing unit determines a foreground blob with the first degree of overlapping being greater than or equal to a first threshold as an interfering foreground blob, and/or, the blob removing unit determines a foreground blob with the second degree of overlapping being greater than or equal to a second threshold as an interfering foreground blob.

8. The apparatus according to supplement 1, wherein the interfering foreground blobs are water blobs and/or light spots.

9. A smoke detection method, including:
detecting foreground blobs in images of a plurality of frames in a video;
determining motion areas of detected foreground blobs;
determining a first degree of overlapping of the foreground blobs in images of at least two frames, and/or determining a second degree of overlapping of the foreground blobs and motion areas to which the foreground blobs correspond;
determining interfering foreground blobs according to the first degree of overlapping and/or the second degree of overlapping; and extracting features from motion areas of remaining foreground blobs with the interfering foreground blobs being removed, and detecting smoke according to the features.

10. The method according to supplement 9, wherein in calculating a first degree of overlapping of a foreground blob, the method includes:
calculating a first overlapping area of the foreground blob in images of a first number of frames, calculating a first area of the foreground blob, and taking a ratio of the first overlapping area to the first area as the first degree of overlapping;

11. The method according to supplement 10, wherein the first number is greater than or equal to 2.

12. The method according to supplement 10 or 11, wherein the first number of frames are a current frame and a frame preceding the current frame in the images of a plurality of frames of the video.

13. The method according to supplement 10 or 11, wherein the first number of frames are consecutive frames.

14. The method according to supplement 9, wherein in calculating a second degree of overlapping of a foreground blob, the method includes:
calculating a second overlapping area of an area of the foreground blob and a second area of a motion area of the foreground blob, and taking a ratio of the second overlapping area to the second area as the second degree of overlapping.

15. The method according to supplement 9, wherein the determining interfering foreground blobs according to the first degree of overlapping and/or the second degree of overlapping includes:
determining a foreground blob with the first degree of overlapping being greater than or equal to a first threshold as an interfering foreground blob, and/or, determining a foreground blob with the second degree of overlapping being greater than or equal to a second threshold as an interfering foreground blob.

16. The method according to supplement 9, wherein the interfering foreground blobs are water blobs and/or light spots.

17. An image processing device, including the smoke detection apparatus in supplement 1.

What is claimed is:

1. An apparatus for smoke detection, comprising:
a memory; and
a processor coupled to the memory where the processor is configured to:
detect foreground blobs in images of a plurality of frames in a video;
determine motion areas of the detected foreground blobs;
determine a first degree of overlapping of the foreground blobs in images of at least two frames, and/or determine a second degree of overlapping of the foreground blobs and motion areas to which the foreground blobs correspond;
determine at least one interfering foreground blob according to the first degree of overlapping and/or the second degree of overlapping; and
extract features from motion areas of remaining foreground blobs with the at least one interfering foreground blob being removed, and detect whether smoke exists in the video according to the extracted features,
wherein the processor determines a first degree of overlapping of a foreground blob among the foreground blobs, calculates a first overlapping area of the foreground blob in images of a number of frames among the plurality of frames, and calculates a first area of the foreground blob, and takes a ratio of the first overlapping area to the first area as the first degree of overlapping, wherein the number of the frames is greater than or equal to 2,
wherein the processor determines a second degree of overlapping of a foreground blob among the foreground blobs, calculates a second overlapping area of an area of the foreground blob and a second area of a motion area of the foreground blob, and takes a ratio of the second overlapping area to the second area as the second degree of overlapping;
wherein the processor determines a foreground blob with the first degree of overlapping being greater than or equal to a first threshold as an interfering foreground blob, and/or, determines a foreground blob with the second degree of overlapping being greater than or equal to a second threshold as an interfering foreground blob.

2. The apparatus according to claim 1, wherein the number of frames using which the processor calculates the first overlapping area include a current frame and a frame preceding the current frame in the images of the plurality of frames of the video.

3. The apparatus according to claim 1, wherein the number of frames are consecutive frames.

4. The apparatus according to claim 1, wherein the at least one interfering foreground blob is a water blob and/or a light spot.

5. A method of smoke detection, comprising:
detecting foreground blobs in images of a plurality of frames in a video;
determining motion areas of the detected foreground blobs;
determining a first degree of overlapping of the foreground blobs in images of at least two frames, and/or determining a second degree of overlapping of the foreground blobs and motion areas to which the foreground blobs correspond;
determining at least one interfering foreground blob according to the first degree of overlapping and/or the second degree of overlapping; and
extracting features from motion areas of remaining foreground blobs with the at least one interfering foreground blob being removed, and detecting whether smoke exists in the video according to the extracted features,
wherein
the determining of the first degree of overlapping of the foreground blobs in the images of the at least two frames comprises:
in calculating a first degree of overlapping of a foreground blob among the foreground blobs, calculating a first overlapping area of the foreground blob in images of a first number of frames, calculating a first area of the foreground blob, and taking a ratio of the first overlapping area to the first area as the first degree of overlapping, the first number of frames is greater than or equal to 2; and
the determining of the second degree of overlapping of the foreground blobs and motion areas to which the foreground blobs correspond comprises:
in calculating a second degree of overlapping of a foreground blob among the foreground blobs, calculating a second overlapping area of an area of the foreground blob and a second area of a motion area of the foreground blob, and taking a ratio of the second overlapping area to the second area as the second degree of overlapping,
wherein the determining of the at least one interfering foreground blob according to the first degree of overlapping and/or the second degree of overlapping comprises:
determining a foreground blob with the first degree of overlapping being greater than or equal to a first threshold as an interfering foreground blob, and/or, determining a foreground blob with the second degree of overlapping being greater than or equal to a second threshold as an interfering foreground blob.

6. The method according to claim 5, wherein the first number of frames include a current frame and a frame preceding the current frame in the images of the plurality of frames of the video.

7. The method according to claim 5, wherein the first number of frames include a current frame and a frame preceding the current frame in the images of a plurality of frames of the video.

8. The method according to claim 5, wherein the first number of frames are consecutive frames.

9. The method according to claim 5, wherein the first number of frames are consecutive frames.

10. The method according to claim 5, wherein the at least one interfering foreground blob is water blob and/or light spot.

11. An image processing device, comprising:
a memory that stores a plurality of instructions; and
a processor that couples to the memory and configured to execute the instructions to:
detect foreground blobs in images of a plurality of frames in a video;
determine motion areas of the detected foreground blobs;
determine a first degree of overlapping of the foreground blobs in images of at least two frames, and/or determining a second degree of overlapping of the foreground blobs and motion areas to which the foreground blobs correspond;
determine at least one interfering foreground blob according to the first degree of overlapping and/or the second degree of overlapping; and
extract features from motion areas of remaining foreground blobs with the at least one interfering foreground blob being removed, and detecting whether smoke exists in the video according to the extracted features;
wherein the processor determines a first degree of overlapping of a foreground blob among the foreground blobs, calculates a first overlapping area of the foreground blob in images of a number of frames among the plurality of frames, and calculates a first area of the foreground blob, and takes a ratio of the first overlapping area to the first area as the first degree of overlapping; wherein the number of the frames is greater than or equal to 2;
wherein the processor determines a second degree of overlapping of a foreground blob among the foreground blobs, calculates a second overlapping area of an area of the foreground blob and a second area of a motion area of the foreground blob, and takes a ratio of the second overlapping area to the second area as the second degree of overlapping;
wherein the processor determines a foreground blob with the first degree of overlapping being greater than or equal to a first threshold as an interfering foreground blob, and/or, determines a foreground blob with the second degree of overlapping being greater than or equal to a second threshold as an interfering foreground blob.

* * * * *